US011879286B2

(12) United States Patent
Hall et al.

(10) Patent No.: US 11,879,286 B2
(45) Date of Patent: Jan. 23, 2024

(54) OVERHEAD DOOR OPENER WITH GUIDE BEARINGS

(71) Applicant: Hall Labs LLC, Provo, UT (US)

(72) Inventors: David R Hall, Provo, UT (US); Jerome Miles, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 683 days.

(21) Appl. No.: 16/805,731

(22) Filed: Feb. 29, 2020

(65) Prior Publication Data

US 2021/0270078 A1 Sep. 2, 2021

(51) Int. Cl.
*E05F 15/684* (2015.01)

(52) U.S. Cl.
CPC ....... *E05F 15/684* (2015.01); *E05Y 2201/434* (2013.01); *E05Y 2900/106* (2013.01)

(58) Field of Classification Search
CPC ............. E05F 15/684; E05Y 2201/434; E05Y 2900/106; E05Y 2201/10; E05Y 2201/628; E05Y 2201/656
See application file for complete search history.

(56) References Cited

U.S. PATENT DOCUMENTS

| | | | | | |
|---|---|---|---|---|---|
| 4,860,813 | A * | 8/1989 | Ballyns | B60J 5/125 | 296/50 |
| 6,276,744 | B1 * | 8/2001 | Huber | E05F 15/686 | 160/181 |
| 11,441,347 | B2 * | 9/2022 | Hall | E05F 15/686 | |
| 2017/0037671 | A1 * | 2/2017 | Angiuli | E05D 13/1215 | |
| 2018/0305968 | A1 * | 10/2018 | Ferri | E05B 47/0005 | |

* cited by examiner

*Primary Examiner* — Quan Zhen Wang
*Assistant Examiner* — Rajsheed O Black-Childress

(57) ABSTRACT

Embodiments of the present disclosure are directed to a motor unit for an overhead door opener. The motor unit comprises a motor and transmission components configured to transmit power from the motor to a shaft of an overhead door opener. The motor unit also includes a case having one or more vertical panels. The case houses the motor and the transmission components. The motor unit also includes guide bearings on an edge of the vertical panels that accommodate a shaft of an overhead door with the case supported by the shaft. The transmission components comprise a shaft-engaging member configured to be secured around the shaft by affixing the shaft-engaging member to the shaft. The transmission components transmit power from the motor to the shaft of the overhead door.

15 Claims, 6 Drawing Sheets

OVERHEAD DOOR OPENER WITH GUIDE BEARINGS

TECHNICAL FIELD

The present disclosure is directed to apparatuses, systems, and methods for installing and operating an overhead door opener.

BACKGROUND

This invention relates to systems and methods for installing an overhead door opener motor unit. Installation and maintenance of overhead doors are labor and skill-intensive. There are many irregularities with overhead doors and the associated mechanisms that can pose difficulties for installation professionals who may or not have adequate training to install the opener mechanisms. There is a need in the art for a simplified installation mechanism that is les error prone than previous systems.

SUMMARY

Embodiments of the present disclosure are directed to a motor unit for an overhead door opener including a motor and transmission components configured to transmit power from the motor to a shaft of an overhead door opener. The motor unit also includes a case having two vertical panels. The case houses the motor and the transmission components. The motor unit also includes guide bearings on an edge of the vertical panels that accommodate a shaft of an overhead door with the case supported by the shaft. The transmission components comprise a shaft-engaging member configured to be secured around the shaft by affixing the shaft-engaging member to the shaft. The transmission components transmit power from the motor to the shaft of the overhead door.

Further embodiments of the present disclosure are directed to an overhead door opener for an overhead door having a door and a rotating shaft. The overhead door opener includes a motor, first transmission components coupled to the motor, and a case housing the motor and the first transmission components, the case including one or more vertically disposed members. The overhead door opener also includes guide bearings coupled to the vertically disposed members configured to engage the shaft and support the motor, first transmission components, and case on the shaft. The overhead door opener also includes second transmission components configured to couple to the shaft without removing the shaft from the overhead door and while the motor, first power transmission components, and case rest on the shaft with the guide bearings contacting the shaft. The first and second transmission components are configured to be engaged to one another while the motor, first power transmission components, and case rest on the shaft with the guide bearings contacting the shaft, and wherein the motor, first transmission components and second transmission components transmit sufficient torque to the shaft to raise and lower the overhead door.

Further embodiments of the present disclosure are directed to a method for installing an overhead door opener, including resting a motor unit case on a shaft of an overhead door at any exposed portion of the shaft. The case comprises guide bearings configured to receive a top portion of the shaft. The method also includes resting the case against an interior wall of a garage, securing the case to the wall with a bracket, and affixing a torque-transmitting member to a portion of the shaft between two guide bearings. The method also includes coupling the torque-transmitting member to a motor within the case.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the present disclosure. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms “a,” “an,” and “the” include plural referents unless the context clearly dictates otherwise. For example, reference to “a substituent” encompasses a single substituent as well as two or more substituents, and the like.

As used herein, “for example,” “for instance,” “such as,” or “including” are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Figure 1:
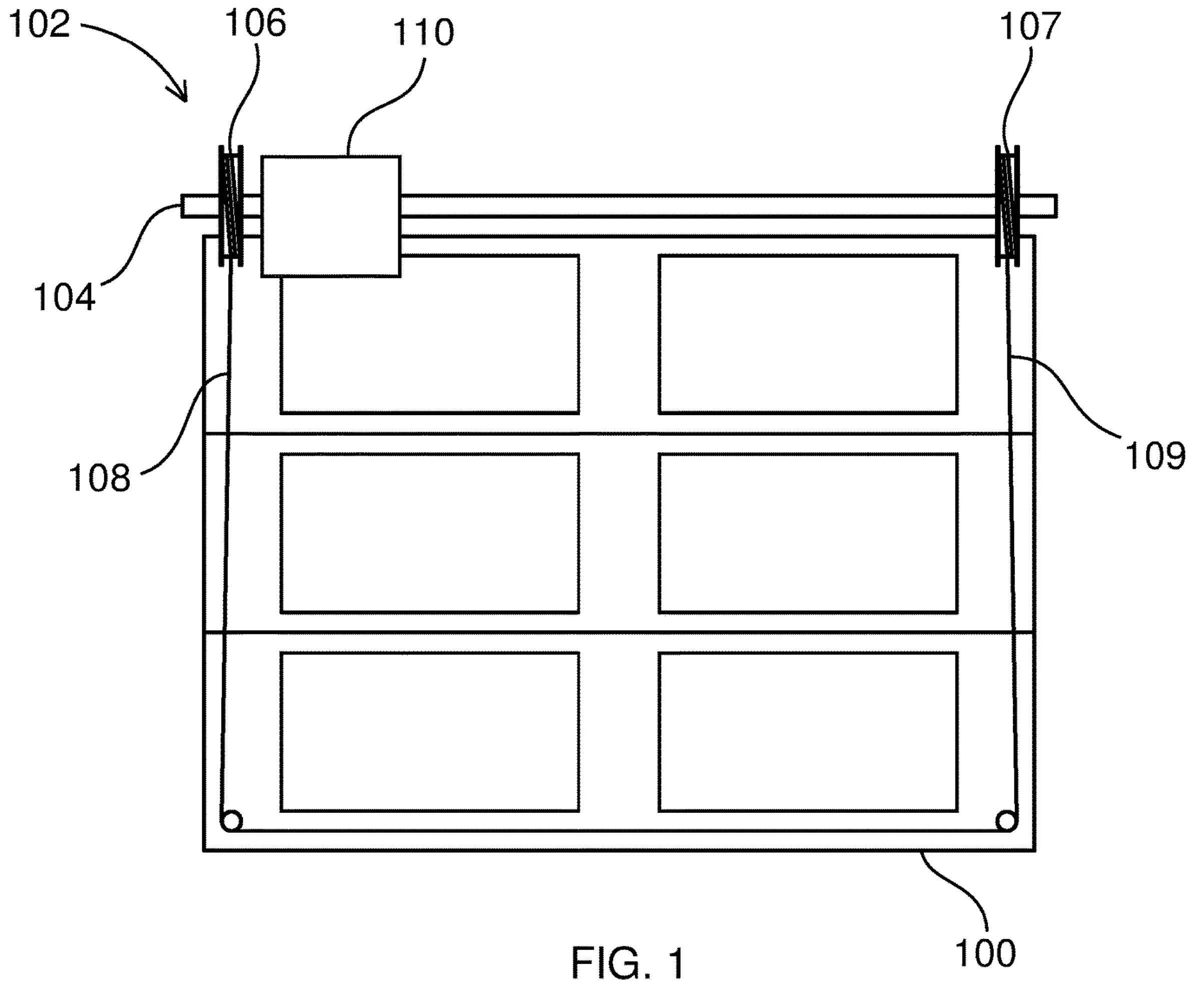
FIG. 1 is a front view of an overhead door according to embodiments of the present disclosure.

FIG. 1 is a front view of an overhead door 100 according to embodiments of the present disclosure. Many homes have overhead doors that are used to enter a garage. Many residential overhead doors are used for automobiles and are opened via a remote control in the car and in the garage to open and close the overhead door. The overhead door 100 of the present disclosure is coupled to an opener 102 which includes a shaft 104, spools 106 and 107 at either end of the shaft 104. Cables 108 and 109 connect to the spools and to the overhead door 100. A motor unit 110 is coupled to the shaft 104 and turns the shaft 104 which turns the spools 106, 107 and winds the cables 108, 109 onto the spools 106, 107 to raise the overhead door 100. The process can be reversed to rotate the shaft 104 in the other direction to unwind the cables 108, 109 from the spools 106, 107 to lower the overhead door 100. In some embodiments the cables are a single cable that extends from one spool 106 to the overhead door 100 and along the lower edge and up to the other spool 107. In other embodiments there can be a single spool on one side of the shaft 104. In still further embodiments the spool is centrally located and the motor unit 110 winds the spool from the center of the overhead door 100.

In some embodiments the motor unit 110 is directly coupled to the shaft 2104 to rotate the shaft 104 to operate the overhead door. In other embodiments the motor unit 110 is coupled to a belt drive or other mechanical system used to raise and lower the overhead door 100.

Figure 2:
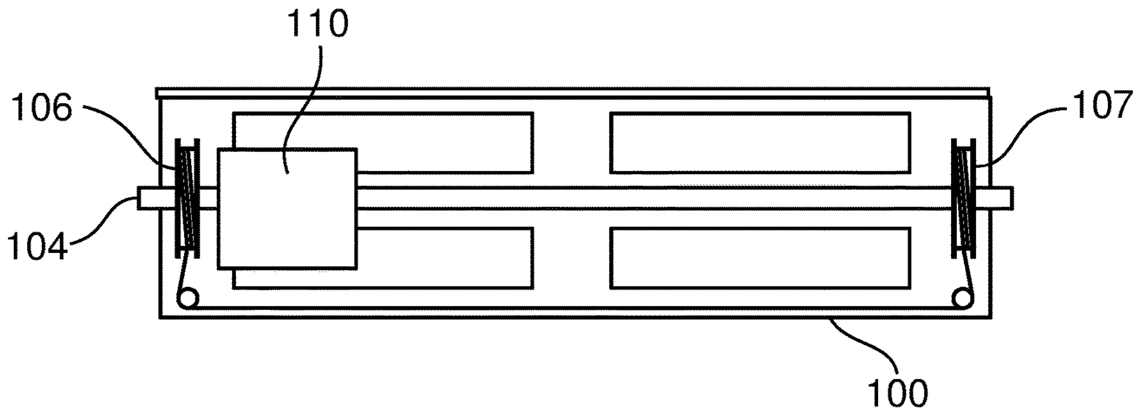
FIG. 2 shows the overhead door in a lifted state with the spools wound up and the cables wound up to raise the overhead door according to embodiments of the present disclosure.

FIG. 2 shows the overhead door 100 in a lifted state with the spools 106, 107 wound up and the cables 108, 109 wound up to raise the overhead door 100. The overhead door 100 can be raised and lowered in response to a signal from a remote or a hard-wired control inside the garage or outside the garage.

Figure 3:
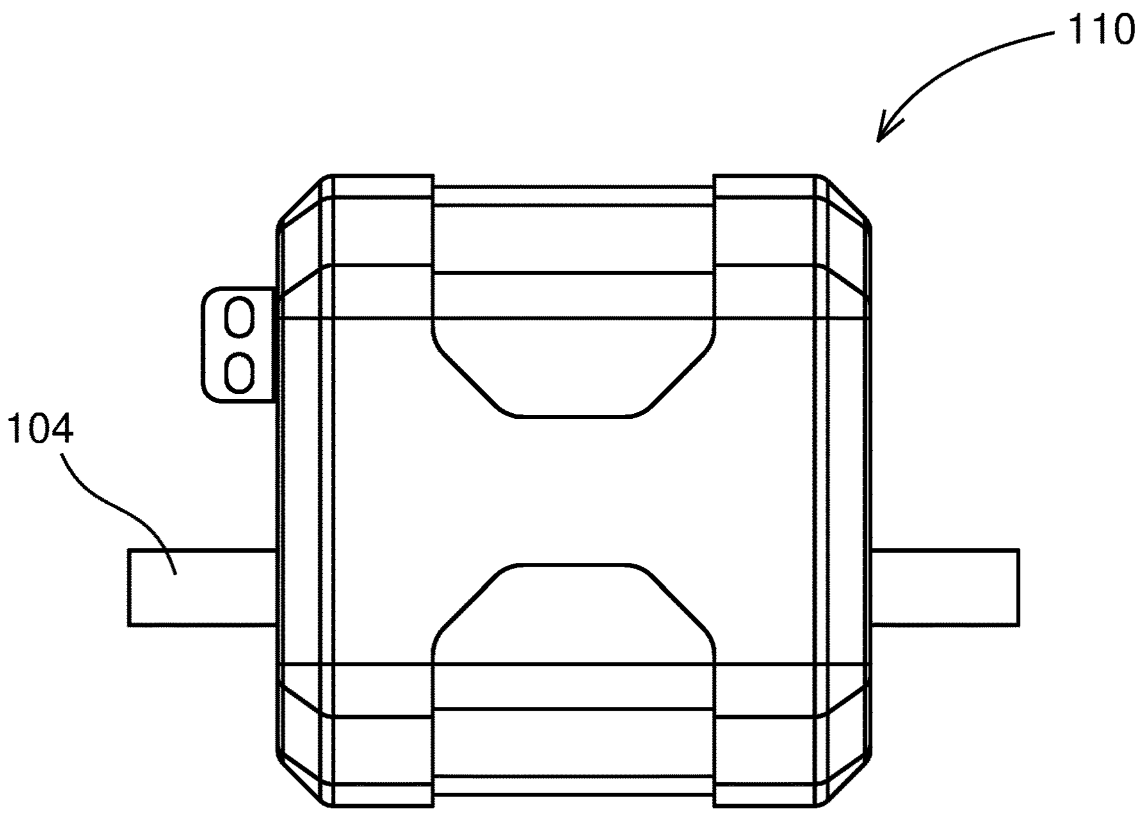
FIG. 3 shows the motor unit according to embodiments of the present disclosure.

FIG. 3 shows the motor unit 110 according to embodiments of the present disclosure. A portion of the shaft 104 is shown protruding from either side of the motor unit 110. The motor unit 110 can be positioned anywhere on the shaft 104, including outside of the spools shown in FIGS. 1 and 2.

Figure 4:
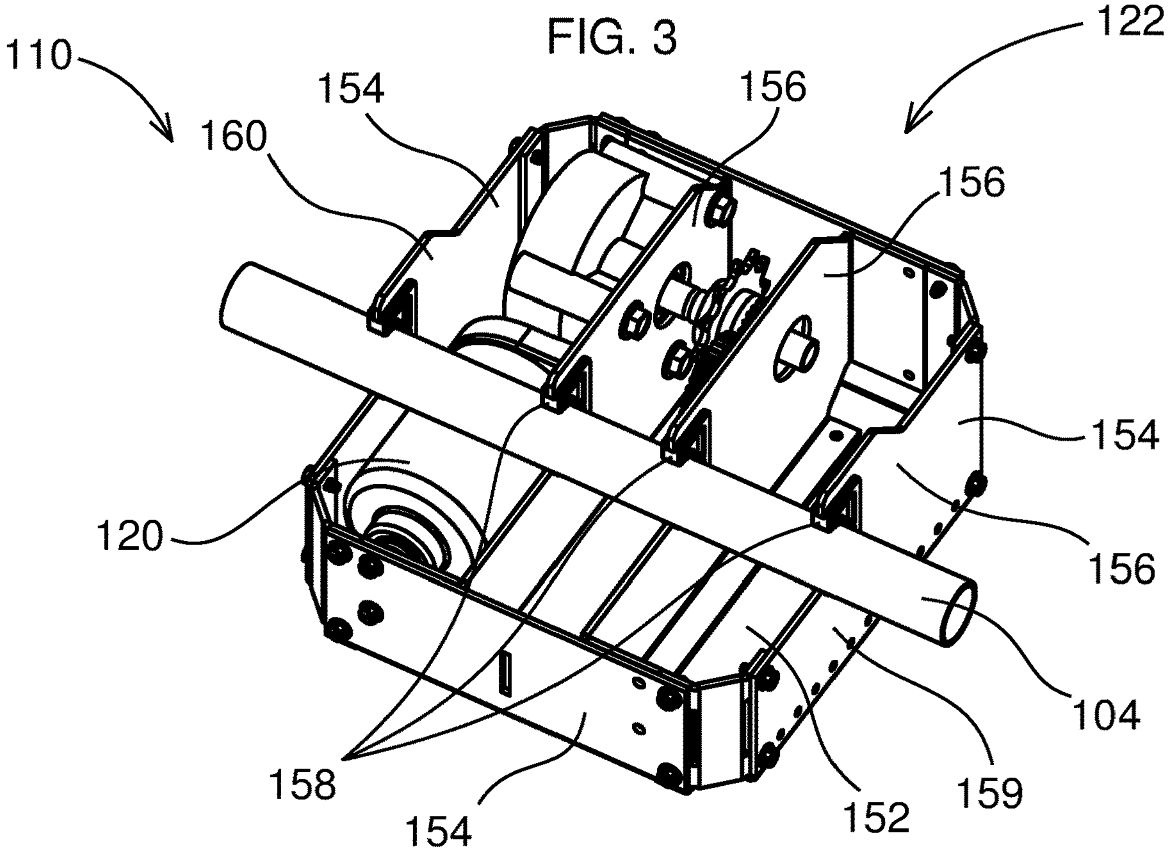
FIG. 4 is an isometric view of the motor unit of the present disclosure with a top cover removed to show interior components.

FIG. 4 is an isometric view of the motor unit 110 of the present disclosure with a top cover removed to show interior components. Installation of the motor unit 110 is initiated with the top cover removed as shown here. The motor unit 110 includes a case 150 that encloses the motor unit 110. The case 150 includes a baseplate 152 and sidewalls 154 that extend upward from the baseplate. The top cover, shown in FIG. 3, when installed will couple to the sidewalls 154 to finish the motor assembly 110 once it has been installed. The baseplate 152 will rest against an interior wall of the garage. Holes 156 in the sidewalls 154 facilitate fastening the case 150 to the wall. The case 150 includes interior panels 156 that are secured to the baseplate 152 and the sidewalls 154. The interior panels 156 provide fastening points for components of the motor 120 and the transmission components 122.

The interior panels 156 also include guide bearings 158 on an overhanging region of the interior panels 156. The guide bearings 158 have a rounded interior surface that is an appropriate size to receive the shaft 104. Standard shafts for overhead doors are one-inch in diameter; however, other sizes are possible and in those cases the guide bearings 158 can be a different dimension to accommodate the shaft 104. Sidewalls 159 and 160 can also include guide bearings 158. The guide bearings 158 can be aligned so they all receive the shaft 104 evenly and distribute the weight of the motor unit 110 substantially equally. In the shown embodiment there are four guide bearings 158, two on interior panels 156, one on sidewall 159, and one on sidewall 160. In other embodiments there may be a larger or smaller number of guide bearings.

The installer places the motor unit 110 onto the shaft 104 with the guide bearings 158 contacting the shaft 104 and supporting the weight of the motor unit 110 upon the shaft 104. The baseplate 152 of the case 150 rests against an interior wall of the garage. A spacer can be used to adjust for different garages having different spacings between the shaft 104 and the garage wall. The motor unit 110 can stably rest against the shaft 104 and the garage while the remainder of the installation takes place.

Figure 5:
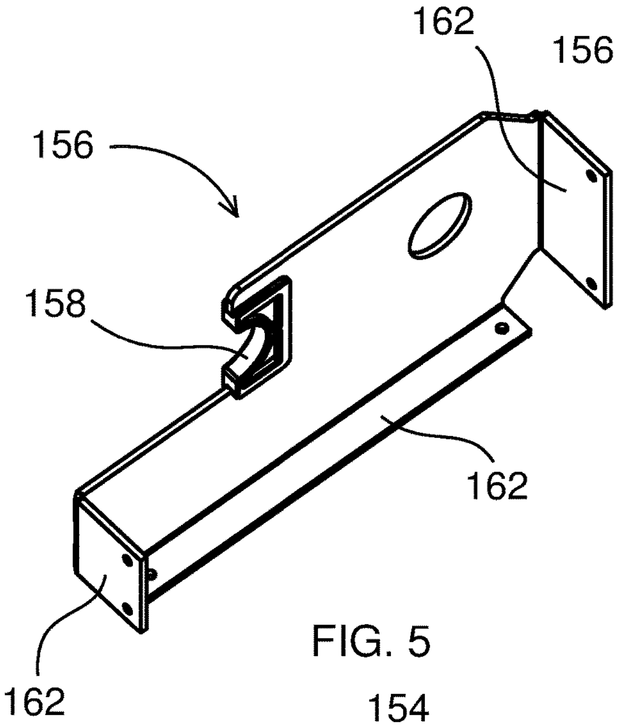
FIG. 5 is an isometric view of an interior panel according to embodiments of the present disclosure.
Figure 6:
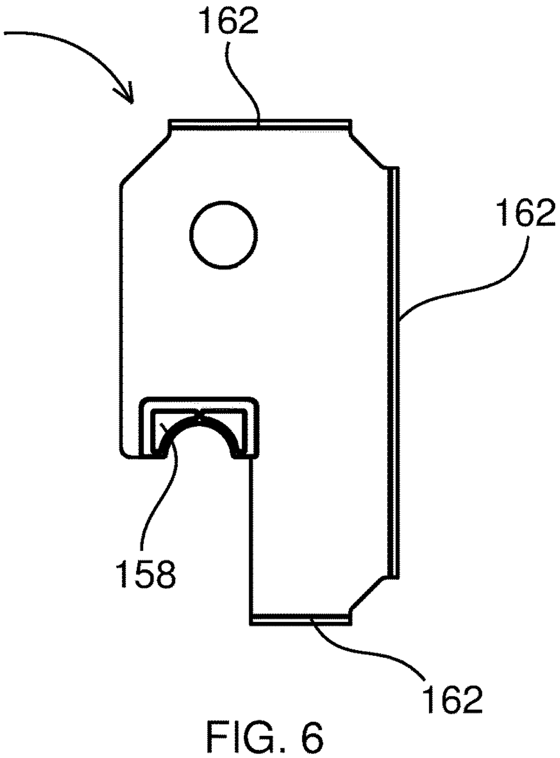
FIG. 6 is a side view of the interior panel according to embodiments of the present disclosure.

FIG. 5 is an isometric view of an interior panel 156 according to embodiments of the present disclosure. FIG. 6 is a side view of the interior panel 156 according to embodiments of the present disclosure. The interior panel 156 can include flanges 162 to provide added strength and to facilitate securing the interior panel 156 to the case. The interior panel 156 can include holes 164 to allow transmission components to pass through the interior panel 156. As shown in FIG. 4, components of the motor and transmission can be fastened to the interior panel 156 as needed. The guide bearings 158 are shown coupled to the panel 156. In some embodiments the interior panel 156 is made of a metal such as steel and the guide bearings 158 are plastic or another suitable material to facilitate the rotation of the shaft in the guide bearing 158. The guide bearings 158 shown in these figures are approximately semi-circular in shape and size. It is to be appreciated that in other embodiments the guide bearings may be less than half of a circle to contact less than half of the outer diameter of the shaft 104. In some embodiments the guide bearing is a flat surface with a single contact point on the shaft 104. The guide bearings 158 can be slid onto the interior panel 156 and can be glued in place or secured by a friction fit.

Guide bearings 158 shown in FIG. 4 on the sidewalls 159, 160 can be generally similar to the guide bearings 158 shown in FIGS. 5 and 6. In some embodiments there may be a single interior panel 156, in other embodiments there are three or more interior panels. In some embodiments the sidewalls 159, 160 do not have guide bearings and instead rely on support from the guide bearings in the interior panels 156. In some embodiment one sidewall 159 has a guide bearing and the other sidewall 160 does not, or vice versa.

Figure 7:
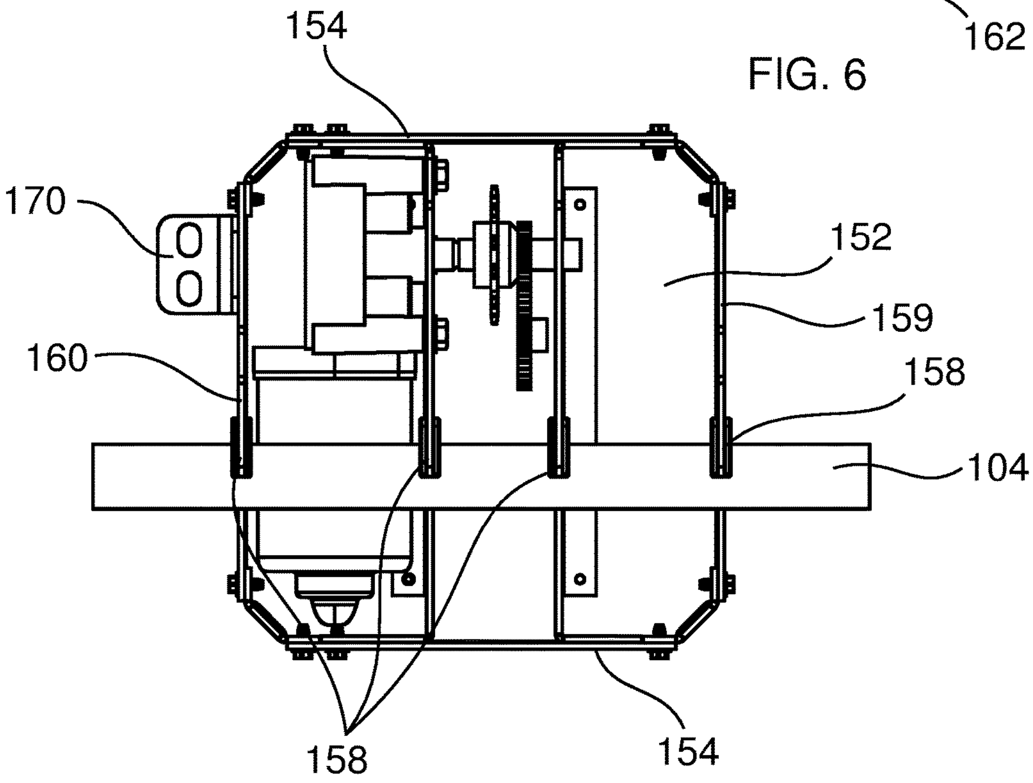
FIG. 7 is a top view of the motor unit and shaft according to embodiments of the present disclosure.

FIG. 7 is a top view of the motor unit 110 and shaft 104 according to embodiments of the present disclosure. The guide bearings 158 are resting on the shaft 104. The case 150 rests against the interior wall of the garage. A bracket 170 can be secured to the case 150 and the wall. Holes in the case can be used to fasten the bracket 170 to the case 150. The bracket 170 can account for differences in spacing between the garage wall and the shaft that may occur from house to house. In other embodiments a spacer (not shown) can be used to fasten the motor unit 110 in place relative to the wall.

Figure 8:
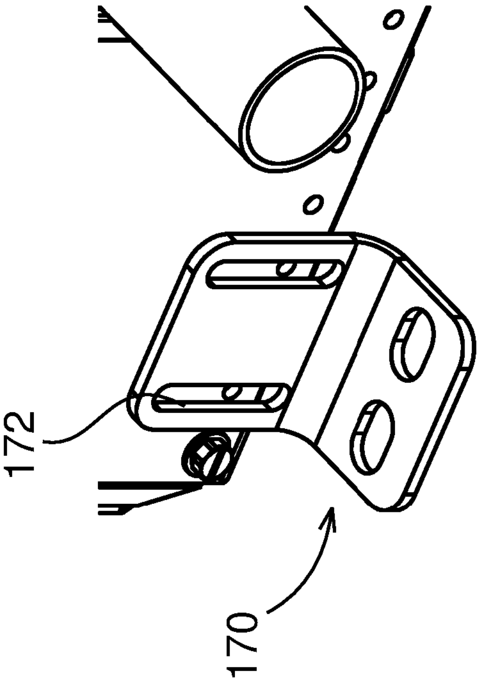
FIG. 8 is an isometric vie of the bracket according to embodiments of the present disclosure.

FIG. 8 is an isometric vie of the bracket 170 according to embodiments of the present disclosure. The bracket 170 has slots 172 that can be used with a fastener such as a screw or bolt or other suitable fastener. The vertical variation in the slots 172 can account for spacing differences between the garage and the shaft 104.

Figure 9:
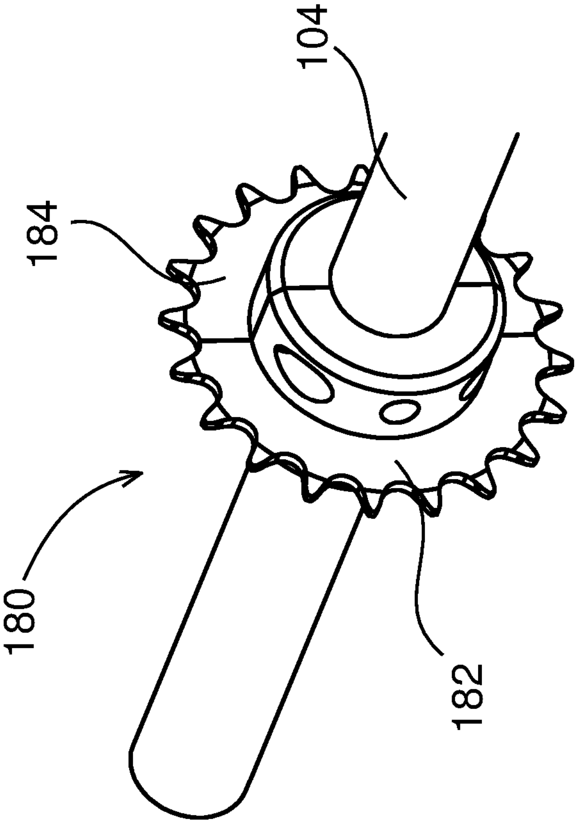
FIG. 9 shows a two-piece sprocket for coupling to the shaft according to embodiments of the present disclosure.

FIG. 9 shows a two-piece sprocket 180 for coupling to the shaft 104 according to embodiments of the present disclosure. A sprocket 180 can be made of two halves 182 and 184 that are fastened together around the shaft with a screw 186 or another suitable fastener. The sprocket 180 can be secured to the shaft 104 at any position along the shaft 104 with sufficient strength that rotation of the sprocket 180 causes rotation of the shaft 104 and ultimately causes raising and lowering of the overhead door by the motor. In some embodiments the sprocket 180 is secured to the shaft 104 with screws that bite slightly into the shaft 104 to secure the sprocket 180 to the shaft 104.

Figure 10:
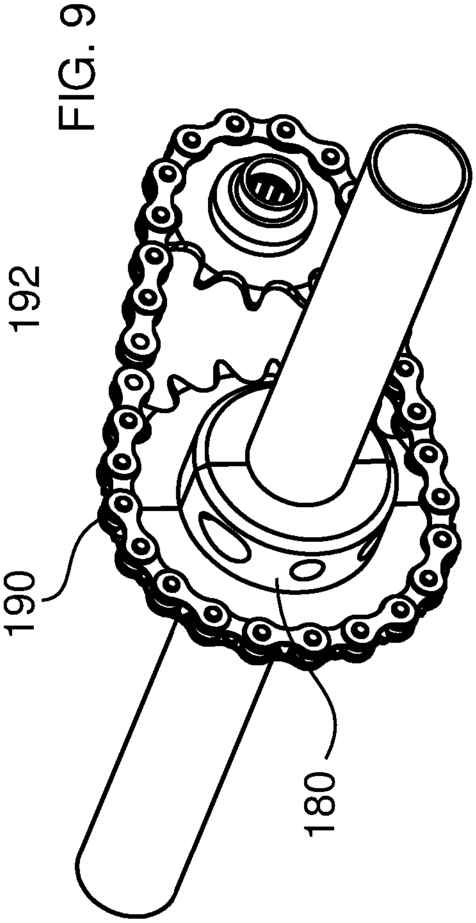
FIG. 10 shows a chain coupled to the sprocket and also coupled to transmission components of the motor unit shown in FIG. 4 according to embodiments of the present disclosure.

FIG. 10 shows a chain 190 coupled to the sprocket 180 and also coupled to transmission components of the motor unit 110 shown in FIG. 4 according to embodiments of the present disclosure. The chain 190 can include a master link that can be assembled easily on site. The transmission components work with the motor to operate the overhead door to raise and lower the door in response to a signal from a remote or a hard-wired button. The transmission components can include gears, belts, and other mechanical equivalents than the chain and sprocket shown in these embodiments. Once the transmission components are installed the cover can be replaced and the installation is complete.

In some embodiments the guide bearings 158 are oriented above the shaft 104 such as what is shown in FIGS. 6 and 7. In other embodiments the guide bearings 158 can be at least partially above the shaft 104 to provide the support for the motor unit 110. The guide bearings 158 can therefore act as a constraint for the shaft 104 relative to an output shaft of the motor. The chain (or other transmission component) provides an upward constraint, and together the chain and guide bearings 158 can fully constrain the upward and downward movement of the shaft 104 relative to the output shaft of the motor. The center-to-center distance between the shaft 104 and the motor is therefore prevented from changing which provides a more stable, smooth movement of the motor and overhead door, and prevents transmission components from becoming derailed or subject to slack or other undesirable movements.

Figure 11:
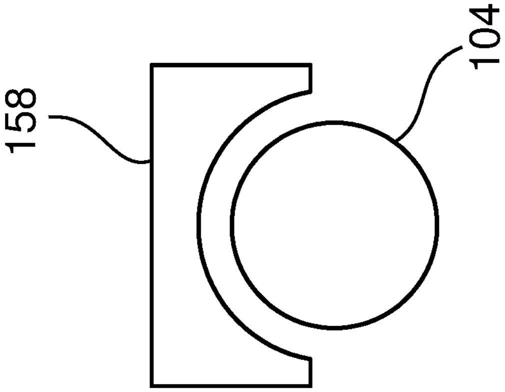
FIG. 11 is a schematic cross-sectional view of a shaft and guide bearing according to embodiments of the present disclosure.

FIG. 11 is a schematic cross-sectional view of a shaft 104 and guide bearing 158 according to embodiments of the present disclosure. The guide bearing 158 is directly above the shaft 104 and forms approximately a semi-circular shape that encircles approximately half of the top portion of the shaft 104. In other embodiments the guide bearing 158 is less than a semi-circle and need not be circular and instead can be a flat surface or a three-planed surface provided there is sufficient bearing to support the movement of the shaft.

Figure 12:
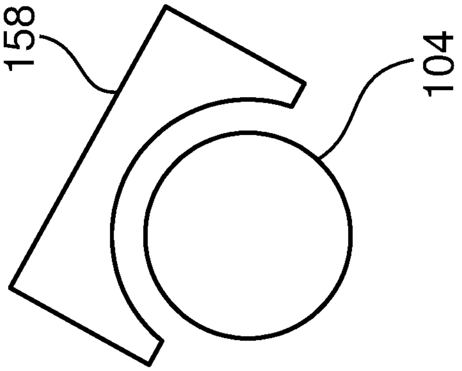
FIG. 12 shows an embodiment in which a guide bearing is in a non-vertical orientation relative to the shaft according to embodiments of the present disclosure.

FIG. 12 shows an embodiment in which a guide bearing is in a non-vertical orientation relative to the shaft 104 according to embodiments of the present disclosure. The guide bearing 158 is cocked to one side and is in a non-vertical orientation. The guide bearing 158 can still provide support for the case and motor for installation purposes and during operation as well. The guide bearing 158 is able to accommodate a case in which the garage wall is far away from the case and the unit has to rotate toward the garage wall and is therefore in a non-vertical position. A spacer can be used to correct some of this variation, but the guide bearing also can accommodate an irregular garage wall situation.

Figure 13:
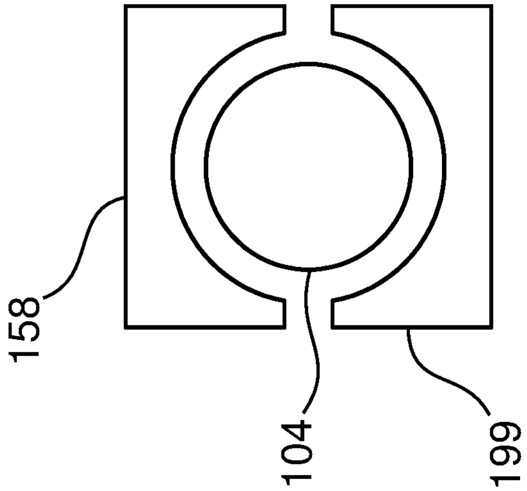
FIG. 13 shows a shaft, guide bearing, and a counter bearing according to embodiments of the present disclosure.

FIG. 13 shows a shaft 104, guide bearing 158, and a counter bearing 199 according to embodiments of the present disclosure. The counter bearing 199 can be attached to the guide bearing 158 or to the vertical panel (interior panel or sidewall). The counter bearing 199 can oppose forces applied by the transmission components onto the shaft. In some embodiments the transmission components urge the shaft away from the motor. A series of gears for example causes a force to be applied that tends to move the shaft away from the motor. The counter bearing 199 stops such movement and maintains a good center-to-center distance. In other embodiments, where the transmission components are a sprocket and chain, for example, the transmission components tend to pull the shaft 104 toward the motor, or at least prevent movement away. In these embodiments the counter bearing 199 can be omitted.

In other embodiments the guide bearings can be oriented differently relative to the shaft. For example, the guide bearings can be upward-facing and the counter bearings can face downward. Or the guide bearings can face forward toward the shaft and mounting the entire unit to the wall serves as the counter bearing and thereby constrains the shaft relative to the motor.

The foregoing results in a motor unit that can be easily assembled at any point on a shaft of an overhead door and does not require the shaft to be removed. The motor unit can be retrofit to any overhead door having a shaft and a door. In some embodiments two or more such motor units 110 can be used to provide a balanced torque or to raise and lower a heavy door or for a large door for a commercial or industrial application.

Figure 14:
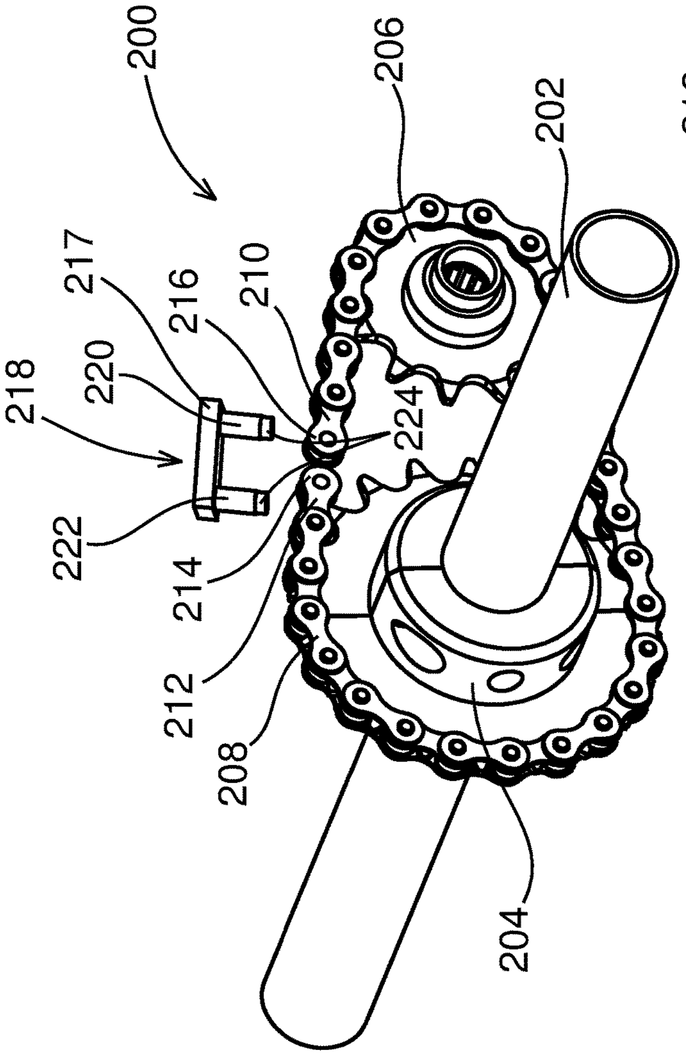
FIG. 14 is an isometric view of a chain mechanism 200 according to embodiments of the present disclosure.

FIG. 14 is an isometric view of a chain mechanism 200 according to embodiments of the present disclosure. The chain mechanism 200 includes a shaft 202, a first sprocket 204, and a second sprocket 206. A chain 208 encircles the sprockets and provides power transmission to for raising and lowering an overhead door as disclosed elsewhere herein. The chain mechanism 200 of this embodiment facilitates installation of the chain 208 around the sprockets 204, 206. Installation is a relatively difficult endeavor, being overhead so the technician is on a ladder with arms raised and operating alone. The chain mechanism 200 is comprised of a series of interlocking links like a bicycle chain. The links alternate with wide links and narrow links, connected with pins. The chain 208 has a first link 210 at one end of the chain, and a second link 212 at the opposite end of the chain 208. As the chain 208 is installed, the technician places the chain 208 around the sprockets 204, 206 and connects the first link 210 to the second link 212. The first and second links have heads 216 and 214 respectively having a hole that is used to connect them together. A connector 218 is used to connect the heads 214, 216 of the first and second links 210, 212.

The connector 218 comprises a body 217 extending parallel with the chain 208 and pins 220 extending perpendicular to the chain 208. The pins are placed into holes in the first link 210 and second link 212. The pins 220 can have a temporary extension 224 that fits easily within the heads 214, 216 of the first and second links 210, 212. The technician can easily fit the plastic extension 224 into the holes using one hand. The extension 224 may be frangibly connected to the pins 220. The extension 224 can be flexible and large enough to form a friction fit within the holes in the heads of the first and second links. The extension 224 holds the chain together temporarily, after which the technician presses the connector 218 more firmly through the holes in the links such that the permanent portion of the links reaches the links 210, 212 to secure the connection. After they are connected the extension 224 can be frangibly removed from the pins 220, leaving a connection established.

Figure 15:
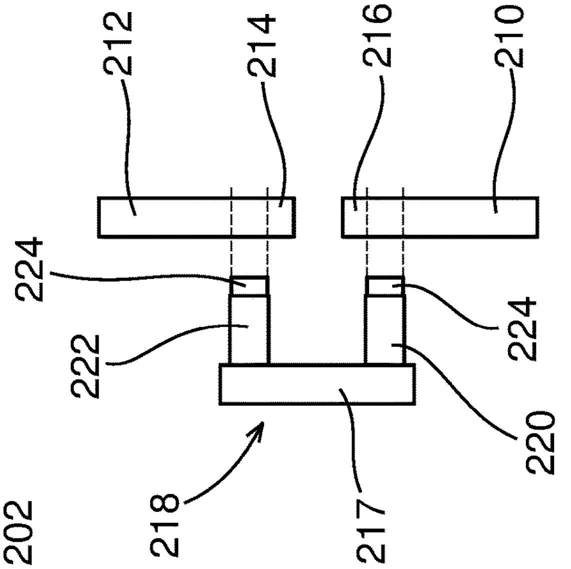
FIG. 15 is an orthogonal top view of the chain mechanism 200 according to embodiments of the present disclosure.

FIG. 15 is an orthogonal top view of the chain mechanism 200 according to embodiments of the present disclosure. The connector 218 can effectively be another link once it is installed. The connector 218 can be a wide link or a narrow link. The connector 218 is shown with body 217, pins 220, and extensions 224. The pins 220 and extensions 224 are aligned with holes in the heads 214, 216 of the first link 210 and second link 212. In some embodiments one or more of these components can be magnetic to hold the parts together during installation. The links 212, 210 can be magnetic, or the connector 218 can be magnetic. In some embodiments the extensions 224 can be magnetic and can be removed once the pins 220 have been pressed completely through the holes to complete the connection. In some embodiments the extension 224 is magnetic and is small enough to fit easily through the holes in the links 210, 212. In some embodiments the extension 224 is magnetically held to the pins 220, such that after installation the extensions 224 can be removed by pulling them off the pins 220.

The foregoing disclosure hereby enables a person of ordinary skill in the art to make and use the disclosed systems without undue experimentation. Certain examples are given to for purposes of explanation and are not given in a limiting manner. All patents and published patent applications referred to herein are incorporated herein by reference.

The invention claimed is:

1. A motor unit for an overhead door opener, which opener comprises a rotating shaft that rotates in one direction when the overhead door is opened and an opposite direction when the overhead door is closed, the motor unit comprising:

a motor;

transmission components configured to transmit power from the motor to the shaft;

a case having multiple vertical panels, the case housing the motor and the transmission components; and a guide bearing held by each of the multiple vertical panels, each guide bearing configured to rotatably accommodate the shaft, with the case housing the motor unit thereby supported by the shaft;

wherein the transmission components comprise a two-piece sprocket fastened together around the shaft at any point along the shaft, so that rotation of the sprocket causes rotation of the shaft.

2. The motor unit of claim 1 wherein the sprocket is configured to receive a chain that is driven by the motor.

3. The motor unit of claim 1 wherein the case includes two exterior vertical panels and two interior vertical panels, and wherein each of the exterior vertical panels and each of the interior vertical panels hold a guide bearing.

4. The motor unit of claim 1 wherein the guide bearings have semi-circular bearing surfaces configured to receive the shaft.

5. The motor unit of claim 1 wherein the two-piece sprocket is secured to the shaft with set screws.

6. The motor unit of claim 1 further comprising counter bearings coupled to the guide bearings and configured to secure the shaft to the case.

7. The motor unit of claim 6 wherein the transmission components exert a force on the shaft in a direction away from the motor, and wherein the counter bearings constrain the shaft relative to the motor.

8. An overhead door opener for an overhead door having a rotating shaft, the overhead door opener comprising:

a motor;

a first transmission component coupled to the motor;

a case housing the motor and the first transmission component, the case including multiple vertically disposed members;

a guide bearing coupled to each of the vertically disposed members and configured to engage the shaft and support the motor, the first transmission component, and case onto the shaft;

a second transmission component configured to couple to the shaft, at any point along the shaft, without removing the shaft from the overhead door and while the motor, the first transmission component, and case rest on the shaft with the guide bearings contacting the shaft;

wherein the first and second transmission components are configured to be engaged to one another while the motor, the first transmission component, and case rest on the shaft with the guide bearings contacting the shaft, wherein the motor, the first transmission component and the second transmission component rotates the shaft to raise and lower the overhead door, and wherein the second transmission component comprises, a two-piece sprocket, wherein a first piece and a second piece are coupled together around the shaft and secured together, and to the shaft, to rotate the shaft and raise and lower the overhead door.

9. The overhead door opener of claim 8 wherein the case comprises at least two vertical members, each including guide bearings, wherein the first transmission components and second transmission components are between the two vertical members.

10. The overhead door opener of claim 8 wherein the second transmission component further comprises a chain, wherein the chain comprises:

a first link at a first end of the chain, the first link having a hole;

a second link at a second end of the chain opposite the first end, the second link having a hole;

a connector comprising:

a body;

a first pin;

a second pin;

a first extension coupled to the first pin;

a second extension coupled to the second pin, wherein the first and second extensions are removably coupled to the first pin and second pin, respectively, wherein the first and second extensions are configured to fit within holes of the first link and second link temporarily, wherein the first and second pins are configured to be pressed through the holes in the first and second links, respectively, and wherein the first and second extensions are configured to be removed from the first and second pins once the first and second pins are in the holes of the first and second links, respectively.

11. The overhead door opener of claim 8 wherein the guide bearings comprise semi-circular bearings configured to encircle approximately half of the diameter of the shaft.

12. The overhead door opener of claim 8, further comprising a cover placed over the case that covers the first and second transmission components and the guide bearings.

13. The overhead door opener of claim 8 wherein the vertically disposed members comprise at least one of side-walls and interior panels.

14. The overhead door opener of claim 8 wherein the first and second transmission components urge the shaft away from the motor, the overhead door opener further comprising counter bearings coupled to the guide bearings that prevent the first and second transmission components from displacing the shaft from the motor.

15. The overhead door opener of claim 8 wherein the first and second transmission components urge the shaft toward the motor, and wherein the guide bearings prevent the first and second transmission components from displacing the shaft from the motor.

* * * * *